(12) United States Patent
Ono et al.

(10) Patent No.: US 11,709,151 B2
(45) Date of Patent: *Jul. 25, 2023

(54) CONTROL METHOD, INSPECTION SYSTEM, AND STORAGE MEDIUM

(71) Applicant: KABUSHIKI KAISHA TOSHIBA, Tokyo (JP)

(72) Inventors: Toshiyuki Ono, Kawasaki Kanagawa (JP); Atsushi Matsumura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/565,154

(22) Filed: Dec. 29, 2021

(65) Prior Publication Data

US 2022/0120715 A1 Apr. 21, 2022

Related U.S. Application Data

(63) Continuation of application No. 16/286,675, filed on Feb. 27, 2019, now Pat. No. 11,249,051.

(30) Foreign Application Priority Data

Jul. 10, 2018 (JP) .................................. 2018-130611

(51) Int. Cl.
*G01N 29/06* (2006.01)
*G01N 29/44* (2006.01)
(Continued)

(52) U.S. Cl.
CPC ....... *G01N 29/069* (2013.01); *G01N 29/0609* (2013.01); *G01N 29/0672* (2013.01);
(Continued)

(58) Field of Classification Search
CPC .. G01N 29/0672; G01N 29/11; G01N 26/265; G01N 29/4409; G01N 29/48;
(Continued)

(56) References Cited

U.S. PATENT DOCUMENTS

| 3,898,838 A | 4/1975 | Connelly |
| 3,978,714 A | 9/1976 | Shraiber et al. |
| 4,470,307 A | 9/1984 | Center et al. |
| 5,497,662 A | 3/1996 | Dykes |

(Continued)

FOREIGN PATENT DOCUMENTS

| CN | 101263384 A | 9/2008 |
| EP | 1 416 443 A1 | 5/2004 |

(Continued)

*Primary Examiner* — Lisa M Caputo
*Assistant Examiner* — Rose M Miller
(74) *Attorney, Agent, or Firm* — Finnegan, Henderson, Farabow, Garrett & Dunner, LLP

(57) ABSTRACT

According to one embodiment, a control method includes setting a transmission angle of an ultrasonic wave to a standard angle. The control method further includes transmitting an ultrasonic wave at the set transmission angle and detecting an intensity of a reflected wave from an object. The control method further includes calculating a tilt angle based on a gradient of the intensity. The tilt angle indicates a tilt of the object. The control method further includes resetting the transmission angle based on the tilt angle.

16 Claims, 15 Drawing Sheets

(51) Int. Cl.
  *G01N 29/11* (2006.01)
  *G01N 29/265* (2006.01)
  *G01N 29/12* (2006.01)
  *G01N 29/48* (2006.01)

(52) U.S. Cl.
  CPC ............ *G01N 29/11* (2013.01); *G01N 29/12* (2013.01); *G01N 29/265* (2013.01); *G01N 29/4409* (2013.01); *G01N 29/48* (2013.01); *G01N 2291/015* (2013.01); *G01N 2291/106* (2013.01); *G01N 2291/267* (2013.01)

(58) Field of Classification Search
  CPC ........... G01N 2291/015; G01N 29/069; G01N 29/0609; G01N 29/12; G01N 2291/106; G01N 2291/267
  USPC .................. 73/602, 634, 633, 618, 621, 302
  See application file for complete search history.

(56) References Cited

U.S. PATENT DOCUMENTS

| | | |
|---|---|---|
| 8,082,793 B2 | 12/2011 | Sarr et al. |
| 8,413,515 B2 | 4/2013 | Isobe et al. |
| 9,700,280 B2 | 7/2017 | Courtney et al. |
| 11,249,051 B2 * | 2/2022 | Ono ..................... G01N 29/11 |
| 2009/0217763 A1 | 9/2009 | Yamano |
| 2010/0005846 A1 | 1/2010 | Yamano |
| 2012/0243771 A1 | 9/2012 | Matsumoto et al. |

FOREIGN PATENT DOCUMENTS

| | | | | |
|---|---|---|---|---|
| JP | 2004150815 A | * | 5/2004 | |
| JP | 2008-51645 A | | 3/2008 | |
| JP | 2011-117877 A | | 6/2011 | |
| JP | 2011203126 A | * | 10/2011 | |
| JP | 2012-251842 A | | 12/2012 | |
| JP | 2019-90727 A | | 6/2019 | |
| WO | WO 2007/024000 A1 | | 3/2007 | |
| WO | WO-2007028356 A1 | * | 3/2007 | ......... G01F 23/2962 |

* cited by examiner

CONTROL METHOD, INSPECTION SYSTEM, AND STORAGE MEDIUM

CROSS-REFERENCE TO RELATED APPLICATIONS

This application is a continuation of application Ser. No. 16/286,675, filed Feb. 27, 2019, now U.S. Pat. No. 11,249,051, issued on Feb. 15, 2022, which is based upon and claims the benefit of priority from Japanese Patent Application No. 2018-130611, filed on Jul. 10, 2018; the entire contents of which are incorporated herein by reference.

FIELD

Embodiments described herein relate generally to a control method, an inspection system, and a storage medium.

BACKGROUND

There is an inspection method in which an ultrasonic wave is transmitted toward an object, and the goodness of the state of the object is inspected using a reflected wave from the object. It is desirable to develop control technology of the inspection method so that the ultrasonic wave can be transmitted toward the object at a more appropriate angle.

DETAILED DESCRIPTION

Figure 1:
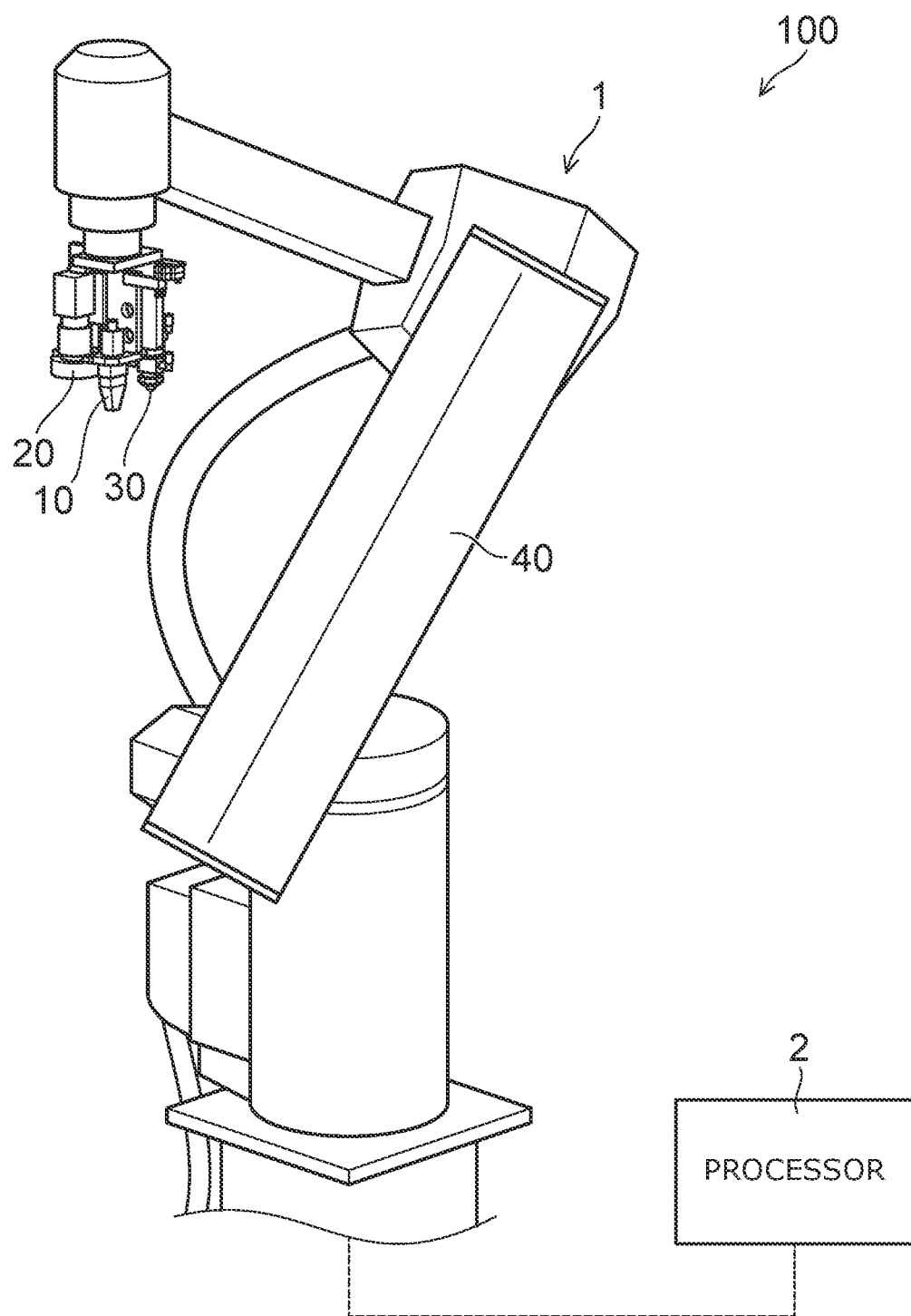
FIG. 1 is a schematic view illustrating an inspection system according to a first embodiment.

According to one embodiment, a control method includes setting a transmission angle of an ultrasonic wave to a standard angle. The control method further includes transmitting an ultrasonic wave at the set transmission angle and detecting an intensity of a reflected wave from an object. The control method further includes calculating a tilt angle based on a gradient of the intensity. The tilt angle indicates a tilt of the object. The control method further includes resetting the transmission angle based on the tilt angle.

Embodiments of the invention will now be described with reference to the drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described thereinabove are marked with like reference numerals, and a detailed description is omitted as appropriate.

First Embodiment

FIG. 1 is a schematic view illustrating an inspection system according to a first embodiment.

Figure 2:
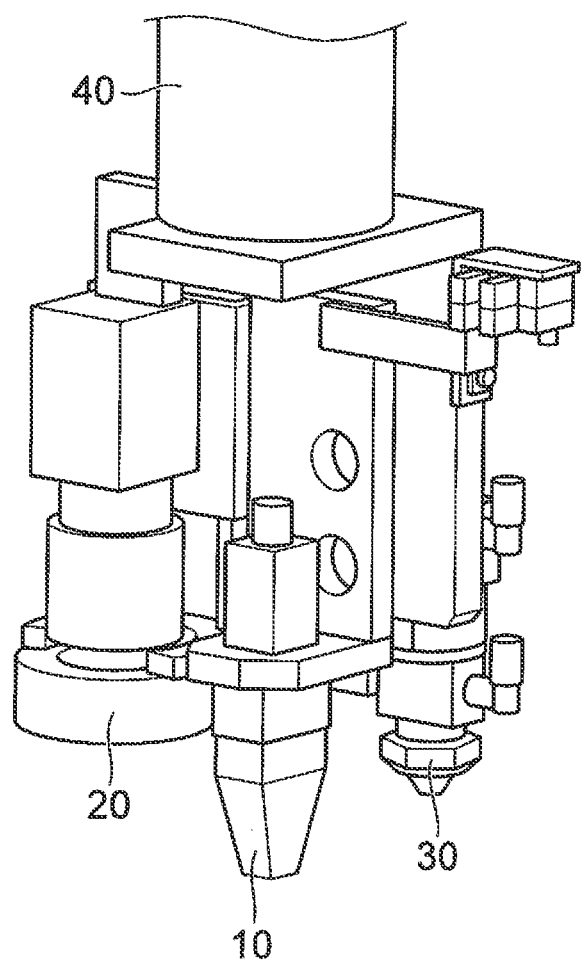
FIG. 2 is a perspective view illustrating a portion of the inspection system according to the first embodiment.

FIG. 2 is a perspective view illustrating a portion of the inspection system according to the first embodiment.

As illustrated in FIG. 1, the inspection system 100 according to the first embodiment includes an inspection apparatus 1 and a processor 2. The inspection apparatus 1 includes a probe 10, an imager 20, a coater 30, and a robot arm (hereinbelow, called the arm) 40.

When welding, one member is made by melting and joining portions of two or more members. The inspection system 100 performs a non-destructive inspection to check whether or not the portion that is welded (hereinbelow, called the weld portion) is joined appropriately.

The probe 10 includes multiple sensors. The multiple sensors transmit ultrasonic waves toward the inspection object (the weld portion) and receive reflected waves from the object. The imager 20 acquires an image by imaging the welded member. The imager 20 extracts the weld mark from the image and detects the position of the weld portion. The coater 30 coats a couplant onto the upper surface of the weld portion. The couplant is used to provide acoustic matching of the ultrasonic wave between the probe 10 and the object. The couplant may be a liquid or a gel.

The probe 10, the imager 20, and the coater 30 are provided at the tip of the arm 40 as illustrated in FIG. 2. The arm 40 is, for example, an articulated robot. The positions of the probe 10, the imager 20, and the coater 30 can be changed by driving the arm 40.

The processor 2 performs various processing based on information acquired by the inspection apparatus 1. The processor 2 controls the operations of each component included in the inspection apparatus 1 based on the information obtained by the processing. The processor 2 includes, for example, a central processing unit (CPU).

The inspection apparatus 1 is connected to the processor by wired or wireless communication. The inspection apparatus 1 may be connected to the processor 2 via a network. Or, the inspection system 100 may be realized by including the processor 2 in the inspection apparatus 1.

Figure 3:
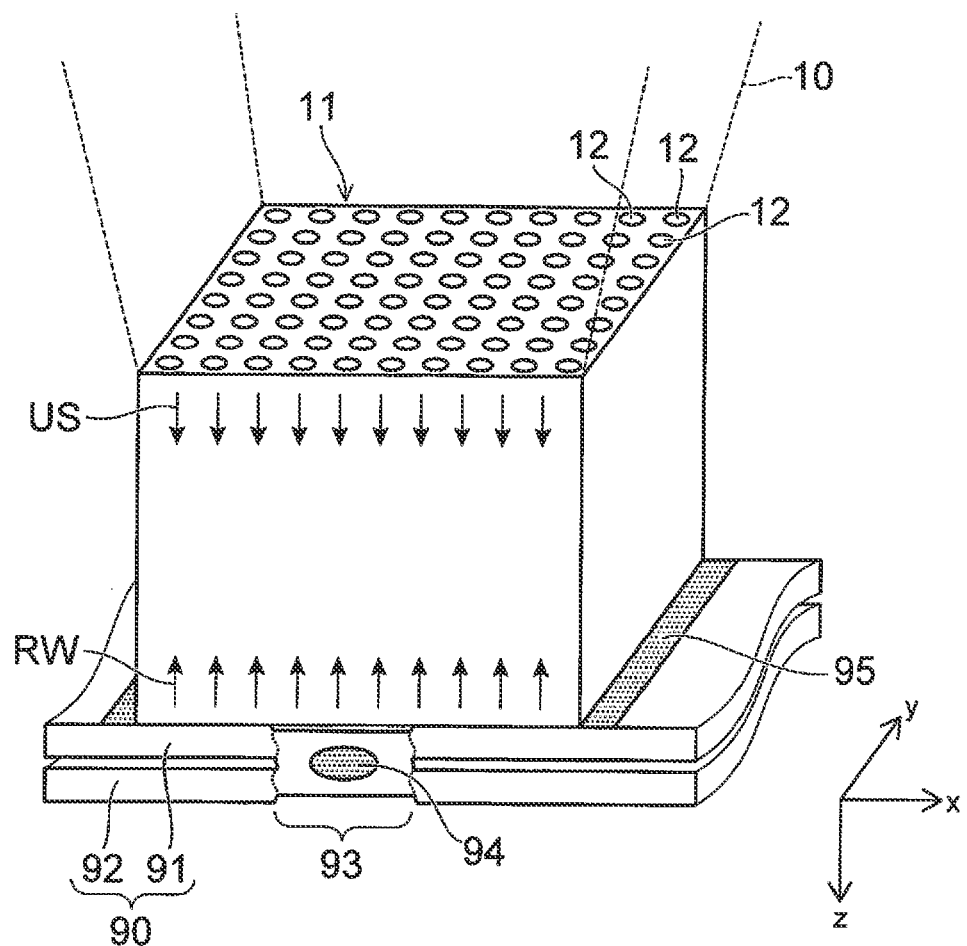
FIG. 3 is a schematic view illustrating the internal structure of the probe tip.

FIG. 3 is a schematic view illustrating the internal structure of the probe tip.

As illustrated in FIG. 3, a matrix sensor 11 is provided inside the probe 10 tip. The matrix sensor 11 includes multiple sensors 12. The sensors 12 can transmit and receive ultrasonic waves. The sensors 12 are, for example, transducers.

The multiple sensors 12 are arranged along a second direction and a third direction; the second direction crosses a first direction in which the ultrasonic waves are transmitted; and the third direction crosses a plane parallel to the first direction and the second direction. In the example of FIG. 3, the first direction corresponds to a z-direction. The second direction and the third direction correspond respectively to an x-direction and a y-direction. Hereinafter, the case will be described where the first direction, the second direction, and the third direction correspond respectively to the mutually-orthogonal z-direction, x-direction, and y-direction.

FIG. 3 illustrates a state of inspecting whether or not a weld portion 93 of a member 90 is welded appropriately. The member 90 is made by spot welding of a first member 91 and a second member 92 at the weld portion 93. The weld portion 93 includes a solidified portion 94. The solidified portion 94 is formed by melting, mixing, and solidifying a portion of the first member 91 and a portion of the second member 92. Each of the sensors 12 transmits an ultrasonic wave US toward the member 90 coated with a couplant 95 and receives a reflected wave RW from the member 90.

In one specific example as illustrated in FIG. 3, the ultrasonic waves US are transmitted toward the weld portion 93 from the multiple sensors 12. For example, beams of the ultrasonic waves traveling in the z-direction are formed by transmitting the ultrasonic waves US in the z-direction simultaneously from the sensors 12. The ultrasonic waves US are reflected by the upper surface or the bottom surface of the member 90. The sensors 12 receive the reflected waves RW. The sensors 12 multiply detect the intensities of the reflected waves at a prescribed time interval.

In another example, one sensor 12 transmits the ultrasonic wave US toward the weld portion 93. The sensors 12 each receive and detect the intensity of the reflected wave RW. Each of the sensors 12 sequentially transmits the ultrasonic wave US. Each time the ultrasonic wave US is transmitted from the sensor 12, the multiple sensors 12 receive the reflected wave RW and detect the intensity at each sensor 12.

The processor 2 determines whether or not the first member 91 and the second member 92 are welded appropriately at the weld portion 93 based on the intensities of the reflected waves RW detected by the sensors 12.

Figure 4:
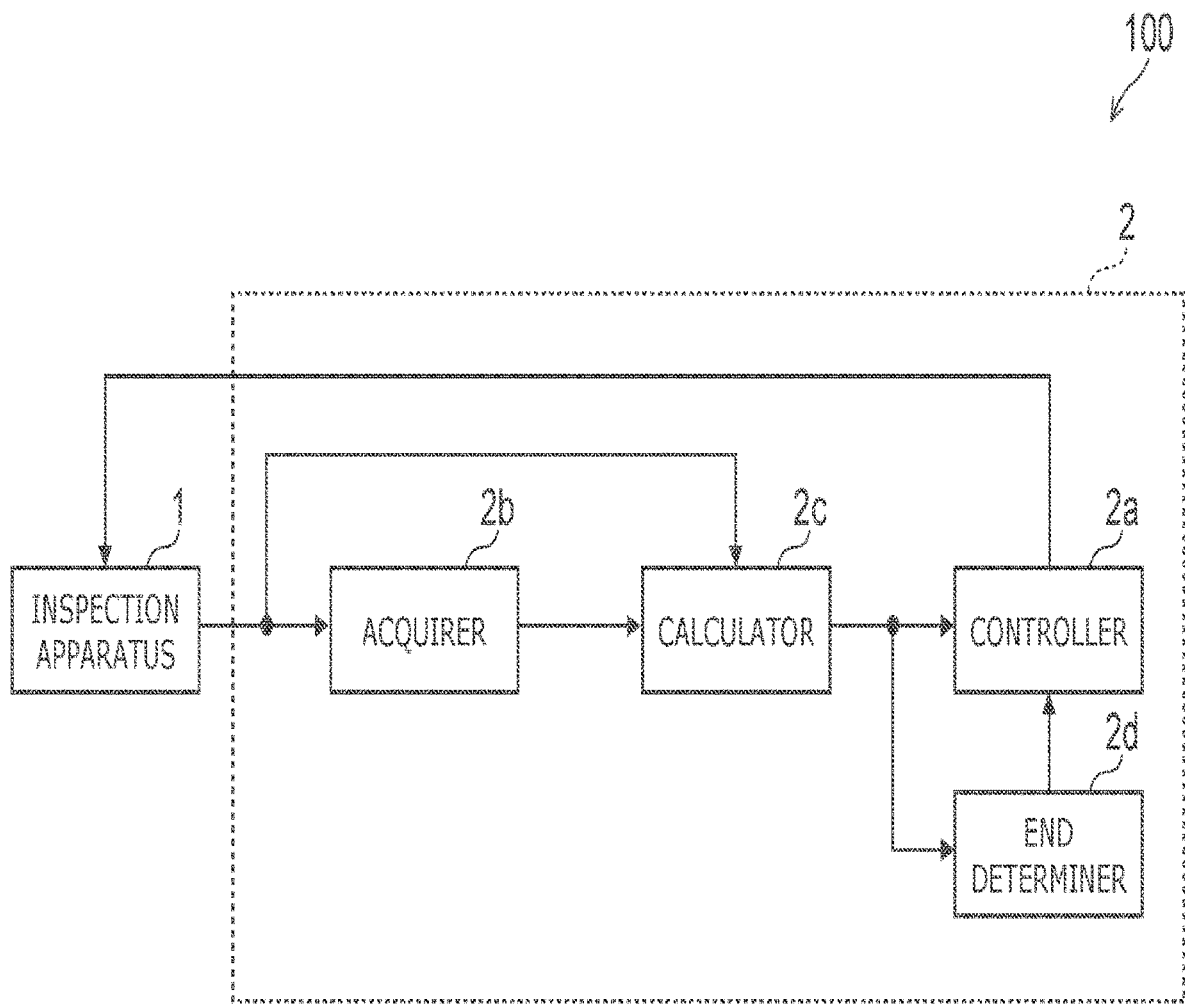
FIG. 4 is a schematic view illustrating the configuration of the inspection system according to the first embodiment.

FIG. 4 is a schematic view illustrating the configuration of the inspection system according to the first embodiment.

Figure 5:
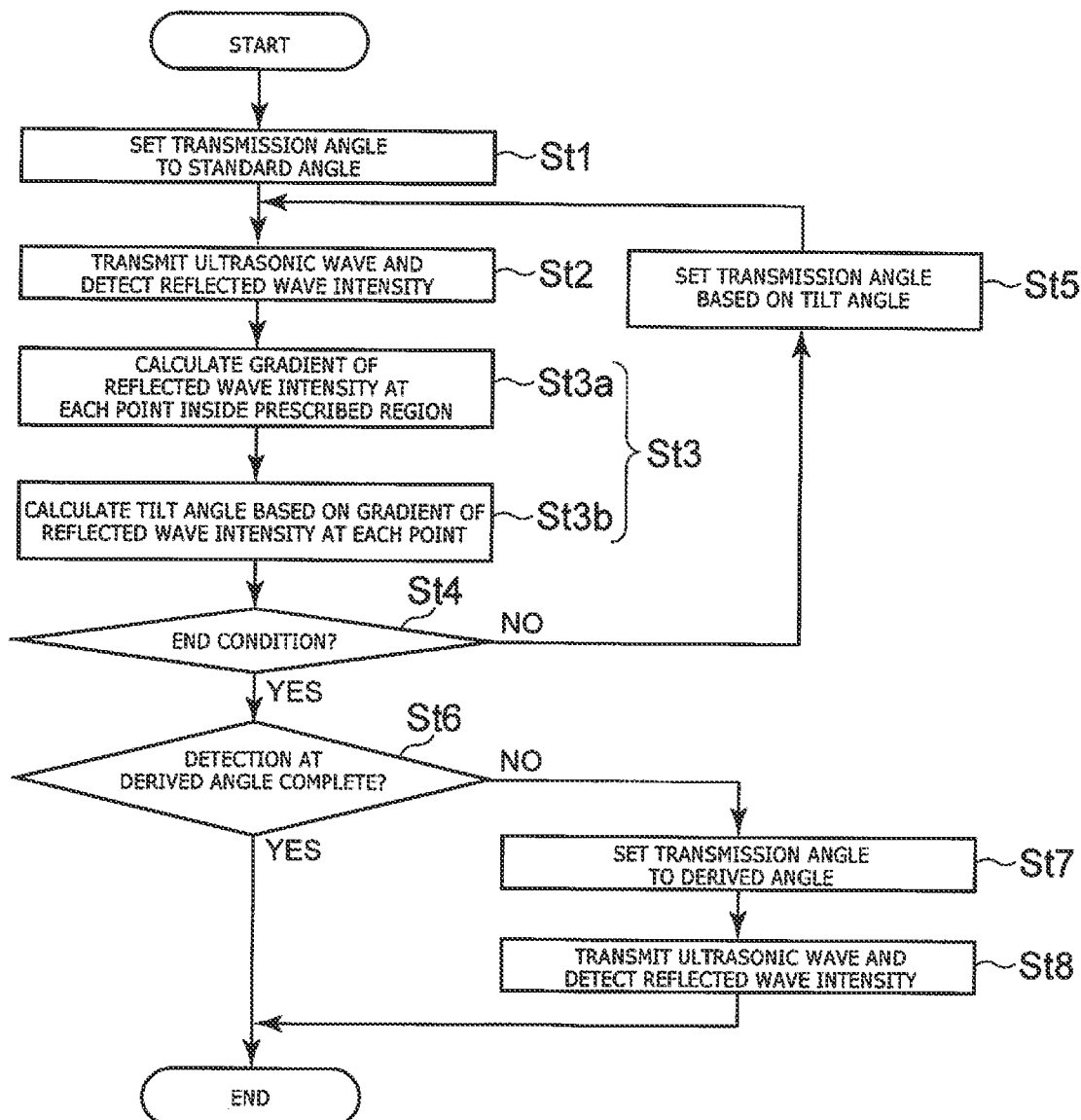
FIG. 5 is a flowchart illustrating the control method according to the first embodiment.

FIG. 5 is a flowchart illustrating the control method according to the first embodiment.

Figure 6:
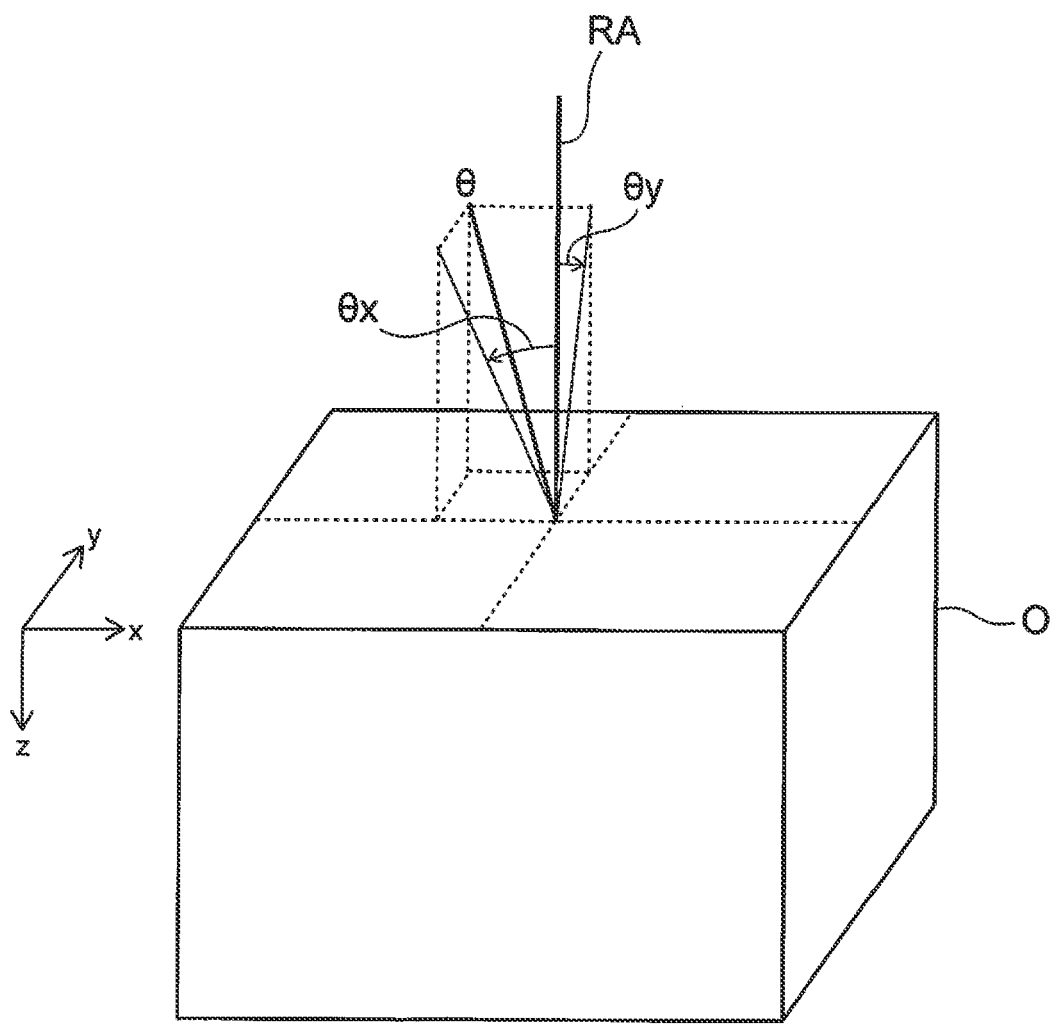
FIG. 6 and FIG. 7 are schematic views describing the control method according to the first embodiment.
Figure 7:
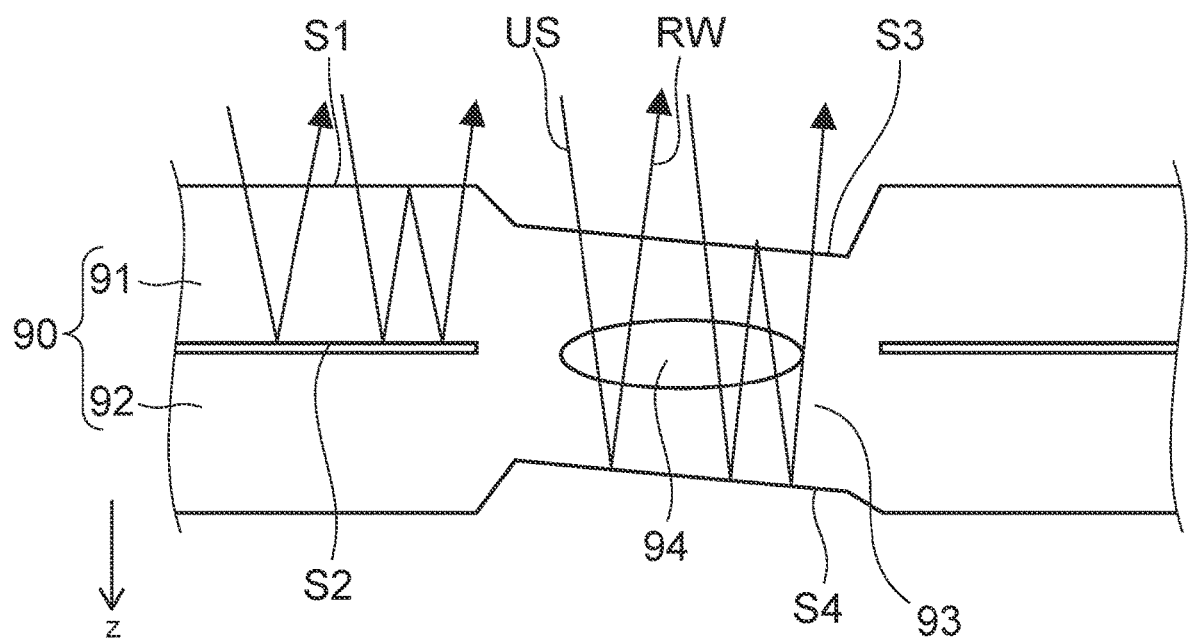

FIG. 6 and FIG. 7 are schematic views describing the control method according to the first embodiment.

As illustrated in FIG. 4, the processor 2 includes, for example, a controller 2a, an acquirer 2b, a calculator 2c, and an end determiner 2d.

In step St1 (a setting step), the controller 2a sets a transmission angle for transmitting the ultrasonic wave toward the object. In step St1, the transmission angle is set to a preset standard angle. If the shape and the orientation of the object O are known, the standard angle is set to a value such that the ultrasonic wave is perpendicularly incident on the surface of the object. Or, the standard angle may be set to a prescribed value added to the value of perpendicular incidence. After setting the transmission angle, the controller 2a transmits a control signal to the inspection apparatus 1. When the inspection apparatus 1 receives the control signal, the inspection apparatus 1 performs operations to transmit the ultrasonic wave at the transmission angle.

As illustrated in FIG. 6, the angle information of a transmission angle θ is represented by a tilt $(\theta_x, \theta_y)$ with respect to a reference angle RA. For example, the reference angle RA is equal to the standard angle set as the transmission angle in step St1.

In the inspection apparatus 1, the transmission angle is adjusted by changing the angle of the probe 10. Or, the transmission angle may be adjusted by controlling the transmitting direction of the ultrasonic beam. For example, the transmitting direction of the ultrasonic beam may be adjusted by controlling the driving timing of the sensors 12 arranged inside the probe 10 without modifying the angle of the probe 10.

In step St2 (a detecting step), the ultrasonic wave is transmitted from the probe 10 of the inspection apparatus 1 toward the object at the transmission angle set in step St1 in a state in which the probe 10 contacts the weld portion 93. The probe 10 detects the intensity of the reflected wave from the object. The ultrasonic wave is strongly reflected at boundaries of materials having mutually-different acoustic impedances.

For example, as illustrated in FIG. 7, the first member 91 has a first surface S1 and a second surface S2. The first surface S1 is positioned between the probe 10 and the second surface S2. The weld portion 93 has a third surface S3 and a fourth surface S4. The third surface S3 is positioned between the probe 10 and the fourth surface S4. In regions other than the weld portion 93, the ultrasonic wave US is reflected strongly by the first surface S1 and the second surface S2 of the first member 91. At the weld portion 93, the ultrasonic wave US is reflected strongly by the third surface S3 and the fourth surface S4.

When the ultrasonic wave is reflected strongly by some surface and the reflected wave is received by the sensor 12, the reflected wave intensity increases temporarily. In other words, the peak of the reflected wave intensity is detected by each sensor 12. The time from when the ultrasonic wave is transmitted from the probe 10 until the peak of the intensity of the reflected wave is detected by the probe 10 is dependent on the position in the z-direction of the surface. Accordingly, the position of the surface strongly reflecting the ultrasonic wave can be verified by detecting the peak of the reflected wave intensity using the sensor 12.

The reflected wave RW undergoes multiple reflection between the first surface S1 and the second surface S2 of the first member 91 and between the third surface S3 and the fourth surface S4 of the weld portion 93. As a result, the peaks of the intensity of the reflected wave are multiply detected by the sensor 12.

There are cases where the fourth surface S4 of the weld portion 93 is not flat. This is due to the solidified portion 94 included in the weld portion 93, shape deformation during welding, etc. In such a case, it is desirable for the ultrasonic wave US to be transmitted, on average, along a direction perpendicular to the fourth surface S4. Thereby, the ultrasonic wave can be reflected more strongly by the fourth surface S4; and the accuracy of the inspection can be increased.

The acquirer 2b acquires, from the inspection apparatus 1, information including the transmission angle and the reflected wave intensities detected by the sensors 12. The acquirer 2b may generate an image based on the acquired reflected wave intensities.

FIG. 8A to FIG. 8C and FIG. 9 are schematic views illustrating images of the weld portion vicinity.

Figures 8A, 8B, 8C:
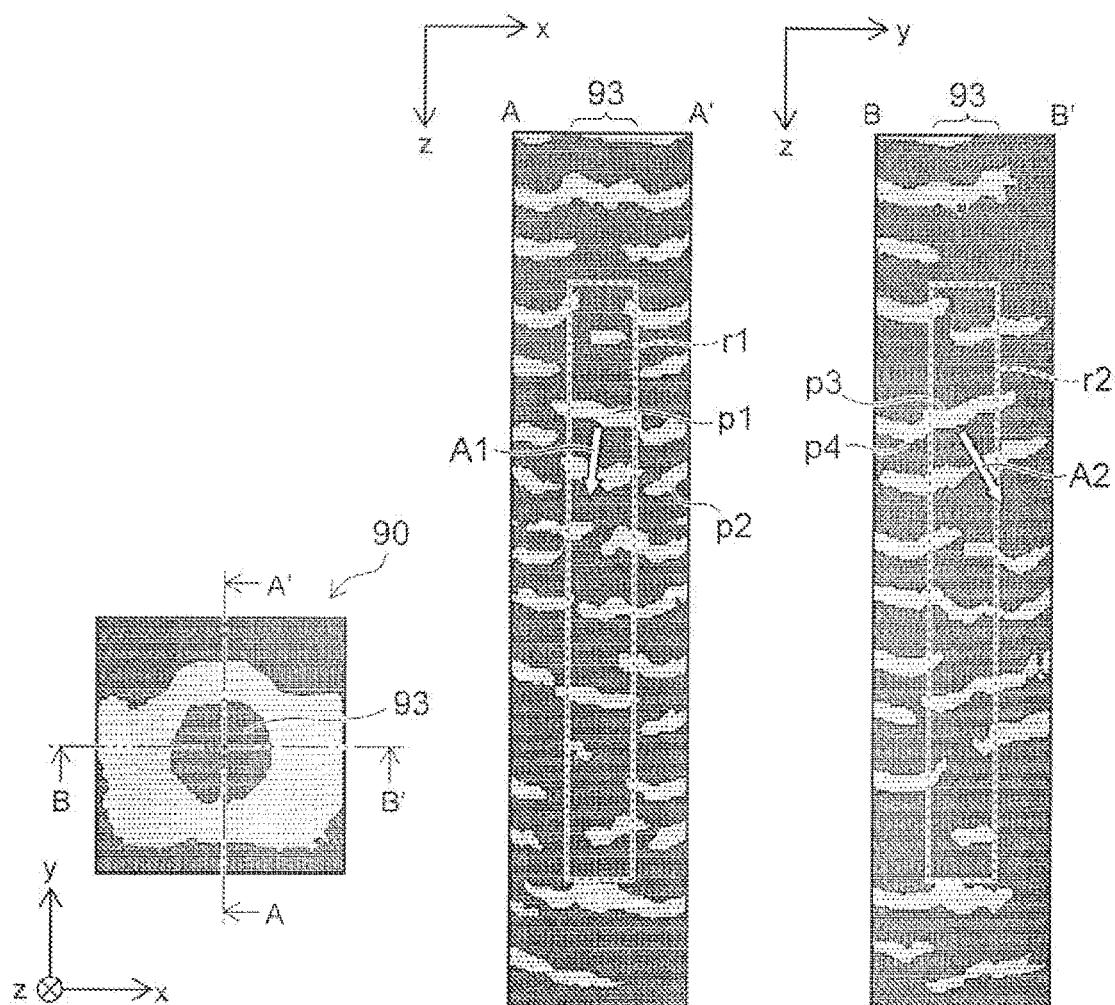
FIG. 8A to FIG. 8C and FIG. 9 are schematic views illustrating images of the weld portion vicinity.
Figure 9:
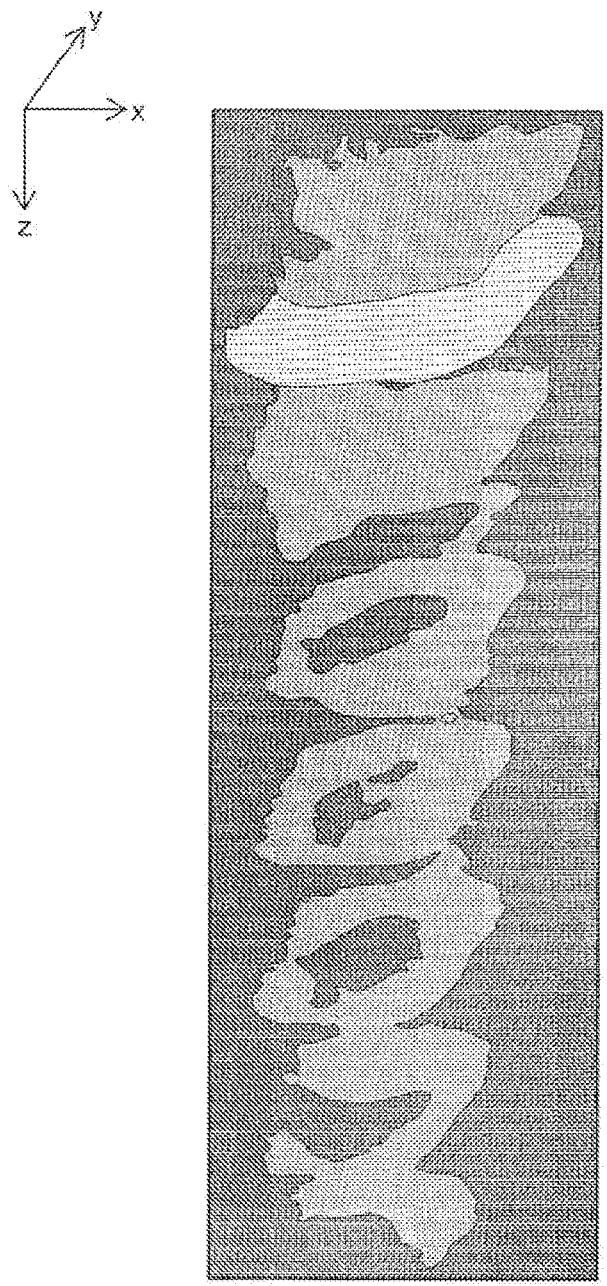

FIG. 8A illustrates an image of the weld portion imaged by the imager 20. FIG. 8B illustrates an image corresponding to an A-A' cross section of FIG. 8A. FIG. 8C illustrates an image corresponding to a B-B' cross section of FIG. 8A. FIG. 9 illustrates the entire image. As illustrated in FIG. 9, the image is volume data storing the values at each three-dimensional position.

The image of FIG. 8B illustrates the reflected wave intensity at each point in the x-direction and the z-direction.

The position in the z-direction corresponds to the time when the reflected wave intensity was detected. In other words, the image of FIG. 8B is based on the results of the reflected wave intensities multiply detected by the multiple sensors 12 arranged in the x-direction. The image of FIG. 8C illustrates the reflected wave intensity at each point in the y-direction and the z-direction. Similarly to FIG. 8B, the position in the z-direction of the image of FIG. 8C corresponds to the time when the reflected wave intensity was detected. The luminance at each point (pixel) included in the images of FIG. 8B, FIG. 8C, and FIG. 9 corresponds to the intensity of the reflected wave. A higher luminance and a whiter color (a lower dot density) means that the intensity of the reflected wave is higher.

In the images, portions exist where pixels having relatively high luminances are continuous in directions crossing the z-direction. In FIG. 8B and FIG. 8C, some of such portions are illustrated as portions p1 to p4. The portions p1 to p4 show surfaces where the ultrasonic wave is reflected strongly.

It can be seen from FIG. 8B and FIG. 8C that the position in the z-direction where the surface is detected is different between the weld portion 93 and a location other than the weld portion 93. For example, in the image of FIG. 8B, the position in the z-direction of the portion p1 is different from the position in the z-direction of the portion p2. In the image of FIG. 8C, the position in the z-direction of the portion p3 is different from the position in the z-direction of the portion p4. This is due to the position in the z-direction of the bottom surface (the second surface S2) of the location other than the weld portion 93 being different from the position in the z-direction of the bottom surface (the fourth surface S4) of the weld portion 93.

As illustrated in FIG. 7, the distance between the first surface S1 and the second surface S2 of the first member 91 is different from the distance between the third surface S3 and the fourth surface S4 of the weld portion 93. Accordingly, the detection interval of the surface in the z-direction is different between the weld portion 93 and the location other than the weld portion 93.

In step St3 (a calculation step), the calculator 2c calculates the tilt angle indicating the tilt of the object based on the gradient of the reflected wave intensity detected by step St2. Specifically, step St3 includes steps St3a and St3b.

In step St3a, the gradient of the reflected wave intensity is calculated at each point inside the prescribed region in three-dimensional space defined by the x-direction, the y-direction, and the z-direction. In the case where images such as those illustrated in FIG. 8A to FIG. 9 are generated based on the reflected wave intensities, this processing corresponds to calculating the gradient of the pixel value for each pixel inside the prescribed region.

The intensity of the reflected wave at coordinates (x, y, z) is taken as I(x, y, z). The prescribed region is, for example, a region having coordinates satisfying x1≤x≤x2, y1≤y≤y2, and z1≤z≤z2 for the constants x1, x2, y1, y2, z1, and z2. It is desirable to designate x1, x2, y1, and y2 so that the prescribed region is included in the weld portion 93. The exterior form of the designated region may be a rectangle, a circle, or any other shape. For example, the range in the z-direction is designated so that the shallow region where the bottom surface (the fourth surface S4) of the weld portion 93 does not appear is excluded, and so that the waves multiply reflected by the fourth surface S4 appear once. Regions r1 and r2 of FIG. 8B and FIG. 8C are examples of the set region.

The gradient of the reflected wave intensity is calculated by the following Formula 1.

$$G(x,y,z)=(I(x+1,y,z)-I(x,y,z),I(x,y+1,z)-I(x,y,z),I(x,y,z+1)-I(x,y,z))$$ [Formula 1]

G(x, y, z) is a three-dimensional vector representing the gradient of the reflected wave intensity in the x-direction, the y-direction, and the z-direction for the coordinates (x, y, z). Formula 1 calculates the gradient using forward differences. General gradient calculation methods such as backward differences, central differences, etc., also may be used.

In step St3b, the tilt angle that indicates the tilt of the weld portion 93 is calculated based on the gradient of the reflected wave intensity. First, the average of the gradient calculated for the prescribed region described above is calculated. This is called the average gradient. The method for calculating the average gradient is not limited to a simple average and may be a weighted average.

For example, the weight that is used is increased as the x coordinate and the y coordinate approach the center of the prescribed region. The x coordinate and the y coordinate of the center of the prescribed region are ((x1+x2)/2, (y1+y2)/2). Thereby, the effects of the region other than the weld portion 93 on the average processing can be reduced. Or, the weight that is used may be increased as the value of G(x, y, z) increases. Or, the weight may be based on information relating to the inspection object. For example, the weight that is used may be increased as the z-direction coordinate approaches the position where the fourth surface S4 of the weld portion 93 is predicted to appear. Thereby, the average processing can be based more on the reflected waves from the fourth surface S4 of the weld portion 93. Or, the average processing described above may be replaced with processing that calculates the median.

The difference angle that indicates the tilt of the weld portion 93 with respect to the transmission angle is calculated using the average gradient described above. The average gradient is written as GM. First, the scale information is excluded from the average gradient; and the two-dimensional vector of the following formula showing the direction information is calculated.

$$(GM(x)/GM(z),GM(y)/GM(z))$$ [Formula 2]

GM(x), GM(y), and GM(z) are respectively the x-, y-, and z-direction components of the average gradient. The $\theta_x$ component of the difference angle is calculated from the first component of Formula 2; and the $\theta_y$ component of the difference angle is calculated from the second component of Formula 2. The calculation may be performed by solving backward from the detection pitch of the reflected wave intensity in the x-direction, the y-direction, and the z-direction.

Or, the probe 10 may be used beforehand to detect the reflected waves while tilting the weld portion 93 at various angles. A table of the relationship between the difference angle and the first component and the second component of Formula 2 is made based on the detection results. The angles are calculated using the table. Or, the calculation relationship may be stored as a regression equation. Then, the tilt angle that corresponds to the tilt of the object is calculated by reversing the sign of the difference angle and adding the result to the current transmission angle.

Arrow A1 of the image of FIG. 8B illustrates the gradient of the reflected wave intensity in the X-Z plane. Similarly, arrow A2 of the image of FIG. 8C illustrates the gradient of the reflected wave intensity in the Y-Z plane.

The tilt angle may be referenced to the reference angle RA as described above, or may be an angle made by reversing the sign of the difference angle with respect to the transmission angle at that point in time. For example, the difference between the transmission angle and the calculated tilt of the surface of the object may be calculated as the tilt angle. Such a difference also substantially indicates the tilt of the object.

In step St4 (a determining step), the end determiner 2d determines whether or not to end the acquisition of the image. Step St5 (a resetting step) is performed if the end has not been determined. In step St5, the controller 2a resets the transmission angle based on the tilt angle calculated in step St3. The controller 2a transmits, to the inspection apparatus 1, a control signal including the reset transmission angle. Thereby, step St2 is performed again. In other words, a first loop that includes step St2, step St3, step St4, and step St5 is performed repeatedly until the end is determined in step St4.

For example, the end is determined in step St4 when step St2 or step St3 has been repeated a prescribed number of times.

In another example, the tilt angle that is calculated in step St3 is stored for each repetition. The end is determined when the calculation result of the tilt angle is determined to be converging. For example, the first loop is multiply performed; and a first tilt angle is calculated by the nth step St3. A second tilt angle is calculated by the (n+1)th step St3. The difference between the second tilt angle and the first tilt angle is calculated; and the end is determined when the difference becomes smaller than a prescribed value. The difference between the second tilt angle and the first tilt angle is, for example, the sum of the absolute value of the difference between the $\theta_x$ components and the absolute value of the difference between the $\theta_y$ components.

For example, in step St5, the tilt angle is used as-is as a transmission angle $\theta_{NEXT}$ that is newly set.

Or, the transmission angle $\theta_{NEXT}$ may be set using the current transmission angle $\theta$ and the tilt angle. For example, the difference between the transmission angle $\theta_{NEXT}$ and the transmission angle $\theta$ may be set to be larger than the difference between the tilt angle and the transmission angle $\theta$. At this time, the difference for at least one of the $\theta_x$ component or the $\theta_y$ component is set to be larger. Thereby, the tilt angle is recalculated to be an angle that is different from the transmission angle $\theta$ and near the predicted tilt of the weld portion 93. The accuracy of the tilt angle calculated next can be increased thereby. The change amount of the angle can be set to be larger if the calculated tilt angle is smaller than the actual tilt of the weld portion 93 due to the detection accuracy of the reflected wave intensity, etc. Thereby, the convergence of the repeatedly-calculated tilt angle can be faster.

In particular, there are many cases where the transmission angle $\theta$ does not converge while the number of updates of the transmission angle $\theta_{NEXT}$ is low. Accordingly, until step St5 is performed a prescribed number of times, it is desirable to set the transmission angle $\theta_{NEXT}$ so that the difference between the transmission angle $\theta_{NEXT}$ and the transmission angle $\theta$ is larger than the difference between the tilt angle and the transmission angle $\theta$. After the prescribed number of times, for example, it is desirable to set the transmission angle $\theta_{NEXT}$ so that the difference between the transmission angle $\theta_{NEXT}$ and the transmission angle $\theta$ is the same as the difference between the tilt angle and the transmission angle $\theta$.

Figure 10A:
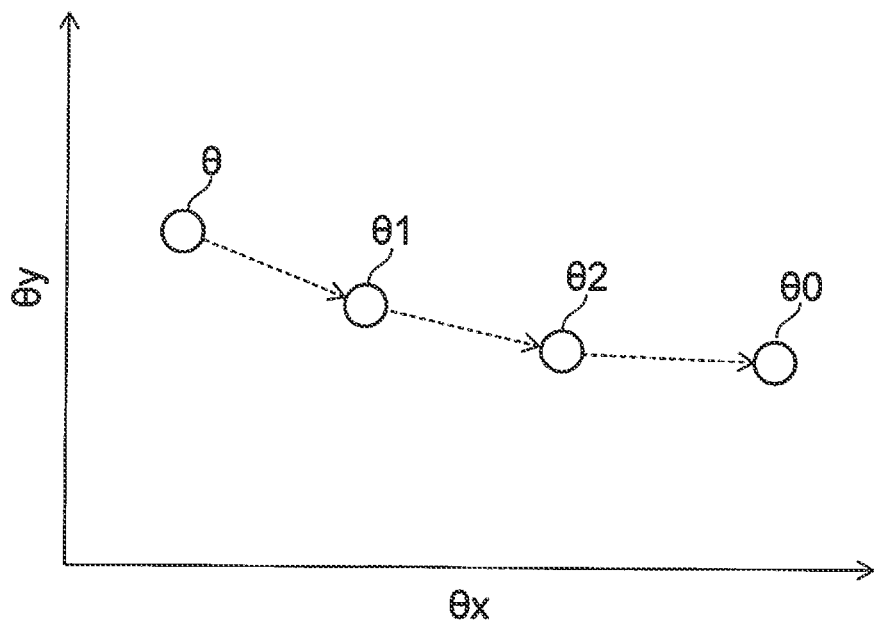
FIGS. 10A and 10B are schematic views describing the control method according to the first embodiment.
Figure 10B:
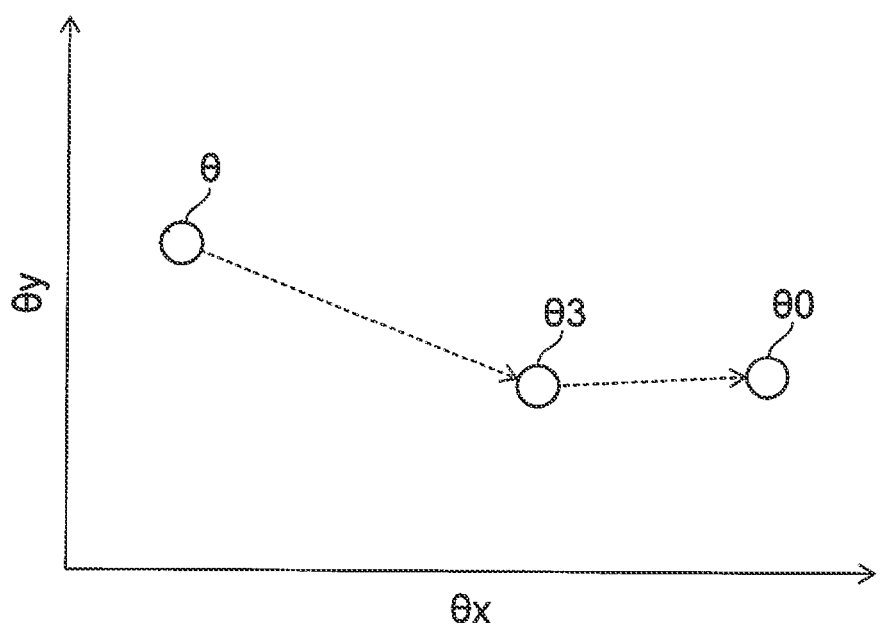

FIGS. 10A and 10B are schematic views describing the control method according to the first embodiment.

In FIGS. 10A and 10B, the horizontal axis is the $\theta_x$ component; and the vertical axis is the $\theta_y$ component. FIG. 10A illustrates the transition of the transmission angle in the case where the tilt angle that is calculated is used as the transmission angle $\theta_{NEXT}$ is used as-is. FIG. 10B illustrates the transition of the transmission angle in the case where the initial transmission angle $\theta_{NEXT}$ is set so that the difference between the transmission angle $\theta_{NEXT}$ and the transmission angle $\theta$ is 2 times the difference between the tilt angle and the transmission angle $\theta$.

As in the transmission angles $\theta$, $\theta1$, and $\theta2$ illustrated in FIG. 10A, there are cases where the transmission angle slowly converges toward an actual tilt angle $\theta0$ of the weld portion 93 if the detection accuracy of the reflected wave intensity is low. For such a case, the method described above can cause the transmission angle to converge rapidly toward the tilt angle $\theta0$ as in the transmission angles $\theta$ and $\theta3$ illustrated in FIG. 10B. Thereby, the number of times the first loop is performed can be low; and the time necessary for the inspection can be shortened.

As another example, the tilt angle is stored for each repetition; and the transmission angle $\theta_{NEXT}$ is calculated based on the tilt angles calculated for a prescribed number of repetitions. For example, $\theta_{NEXT}$ is calculated using the average of the tilt angles calculated for the prescribed number of repetitions.

Step St6 is performed when the end is determined in step St4. In step St6, it is determined whether or not step St2 was performed in the state in which the transmission angle is set to a derived angle. The derived angle is derived based on the tilt angles calculated up to this point, and is the angle estimated to correspond to the tilt of the object. For example, the tilt angle that is calculated directly previously is set as the derived angle. This is because the tilt angle that is calculated directly previously is considered to be most proximal to the actual tilt of the object. Or, the average of the multiple tilt angles calculated directly previously may be set as the derived angle. Step St7 and step St8 are performed in the case where step St2 has not been performed in the state in which the transmission angle is set to the derived angle. In step St7, the transmission angle is set to the derived angle. In step St8, similarly to step St2, the ultrasonic wave is transmitted toward the object at the set transmission angle; and the intensity of the reflected wave is detected. An image may be generated based on the detection results of step St8.

The inspection ends after step St8 or in the case where step St2 already has been performed with transmission angle set to the derived angle.

As described above, the results of the inspection of whether or not the welding is performed appropriately is affected by the angle of the ultrasonic wave transmitted toward the member 90. An inspection performed with the probe 10 at an inappropriate angle may determine the joint to be an incomplete weld even though the actual joint is welded appropriately. Therefore, it is desirable for the angle of the probe 10 to be set to the appropriate value.

Higher perpendicularity of the transmission angle of the ultrasonic wave with respect to the surface of the object provides a higher intensity of the ultrasonic wave reflected by the surface, and a higher accuracy of the detection of the position of the surface. It is therefore desirable for the transmission angle to be set to be perpendicular to the surface of the weld portion 93 which is the object.

According to the inspection system 100 and the control method according to the first embodiment as described above, the tilt angle that indicates the tilt of the inspection object is calculated based on the gradient of the reflected wave intensity. A tilt angle that is near the actual tilt of the object can be calculated by using the gradient of the reflected wave intensity. The angle of the ultrasonic wave transmitted toward the object can be set to a more appropriate value by setting the transmission angle based on the calculated tilt angle. Thereby, the accuracy of the inspection can be increased. Or, the appropriate transmission angle can be found more rapidly when resetting the transmission angle until the appropriate inspection result is obtained; and the time necessary for the inspection can be shortened.

Here, an example is described in which the weld portion 93 is inspected using the inspection system 100 and the control method according to the first embodiment. The inspection system 100 and the control method according to the first embodiment also can inspect objects other than weld portions. For example, the inspection of the strain of the back surface of a metal container that cannot be visually confirmed from the outside, etc., can be performed. According to the embodiment, for such inspections as well, the accuracy of the inspection can be increased; or the time necessary for the inspection can be shortened.

Second Embodiment

Figure 11:
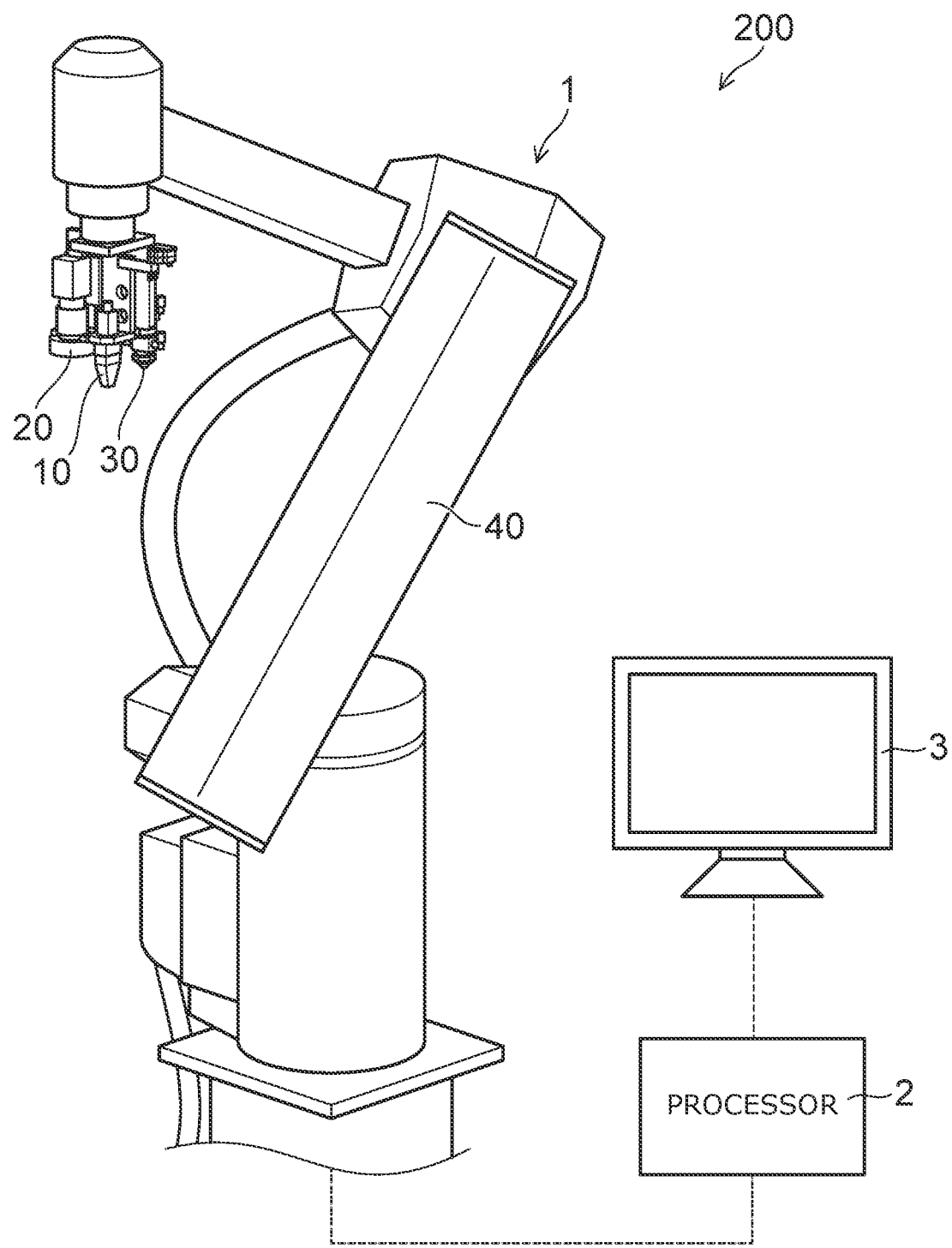
FIG. 11 is a schematic view illustrating an inspection system according to a second embodiment.

FIG. 11 is a schematic view illustrating an inspection system according to a second embodiment.

Figure 12:
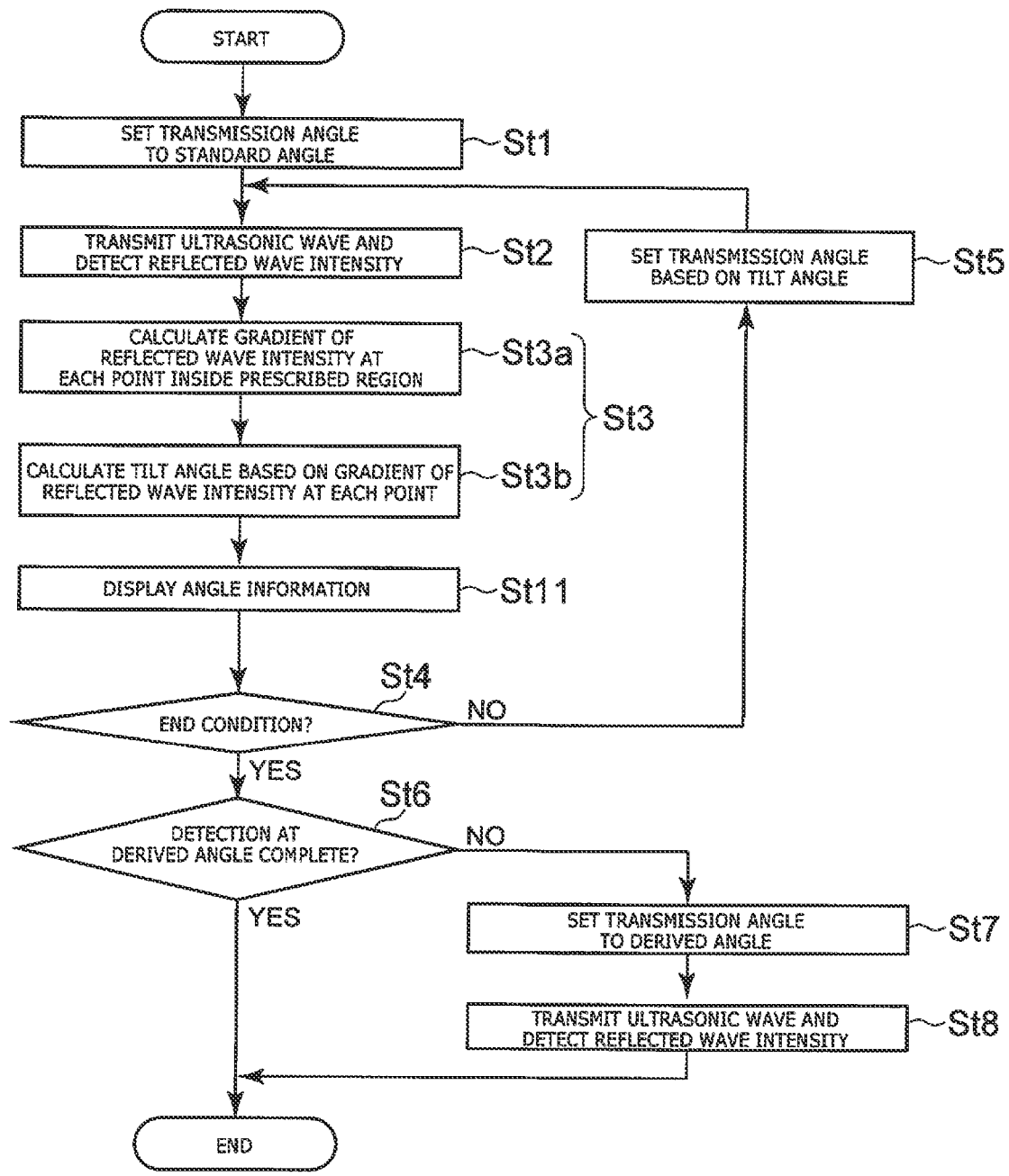
FIG. 12 is a flowchart illustrating a control method according to the second embodiment.

FIG. 12 is a flowchart illustrating a control method according to the second embodiment.

The inspection system 200 according to the second embodiment further includes a displayer 3. For example, the displayer 3 has a wired or wireless connection to the processor 2. The displayer 3 displays information acquired by the inspection apparatus 1 or information processed by the processor 2. The displayer 3 includes, for example, a display, a touch panel, or a printer.

The control method according to the second embodiment further includes step St11 as illustrated in FIG. 12. Each time step St2 is performed, at least one of the imaging angle or the transmission angle at that point in time is displayed by the displayer 3 in step St11.

Figure 13:
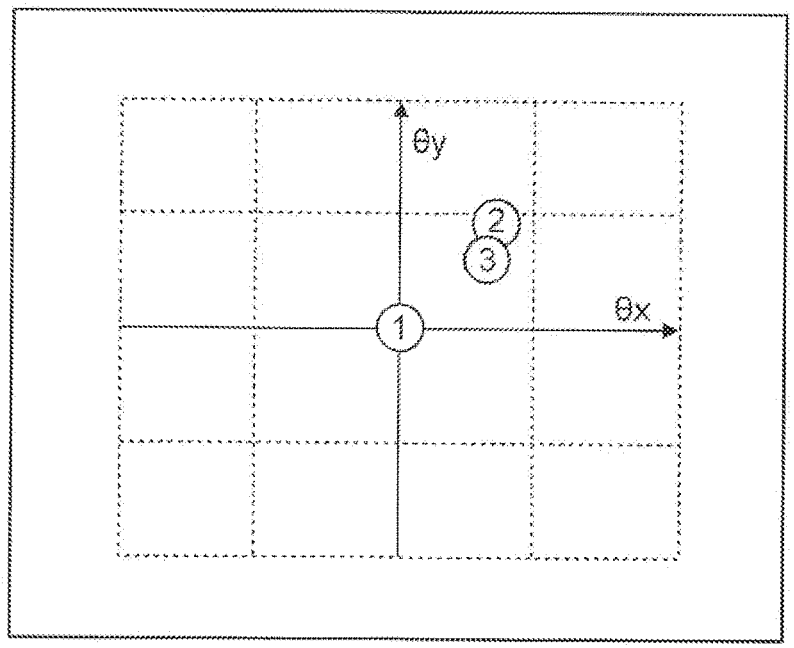
FIG. 13 and FIG. 14 are display examples of the inspection system according to the second embodiment.
Figure 14:
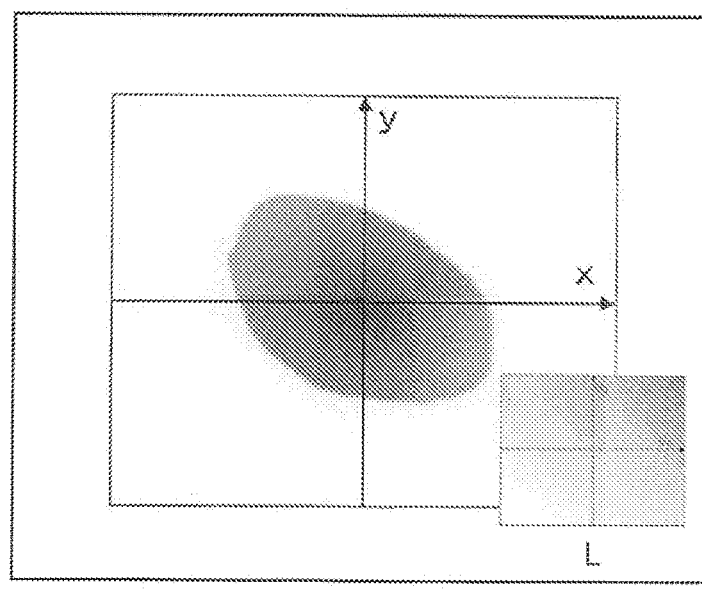

FIG. 13 and FIG. 14 are display examples of the inspection system according to the second embodiment.

For example, as illustrated in FIG. 13, a graph for plotting $\theta_x$ and $\theta_y$ of the transmission angle are displayed on the display of the displayer. The transmission angle and its number are plotted each time steps St2 and St3 are performed, Thereby, the user can easily confirm the transition of the transmission angle. The tilt angle may be plotted similarly. Thereby, the user can confirm easily whether or not the tilt angle is converging or the tilt angle is being calculated surely. Or, other than the plotting method described above, the history may be displayed in text form.

As another display example, the tilt angle is calculated for each coordinate in the x-direction and the y-direction by processing similar to that of step St3; and the tilt angle is displayed for each coordinate. FIG. 14 is such an example. In FIG. 14, the luminance of each point shows the tilt at that point. A legend L of the angle is displayed at the lower right of FIG. 14. FIG. 14 illustrates a state in which different tilt angles are calculated between the weld portion 93 at the image center and the non-weld portion at the periphery of the weld portion 93. By such a display, the user can easily ascertain the exterior form of the weld portion 93 (the tilt of the fourth surface S4).

Both the graph illustrated in FIG. 13 and the image illustrated in FIG. 14 may be displayed. For example, in the case where the fourth surface S4 of the weld portion 93 is curved, etc., the inspection time may increase due to a higher number of calculations of the tilt angle. In such a case, the display of both the graph illustrated in FIG. 13 and the image illustrated in FIG. 14 can allow the user to easily ascertain the higher number of calculations and the reason for the increase.

Third Embodiment

Figure 15:
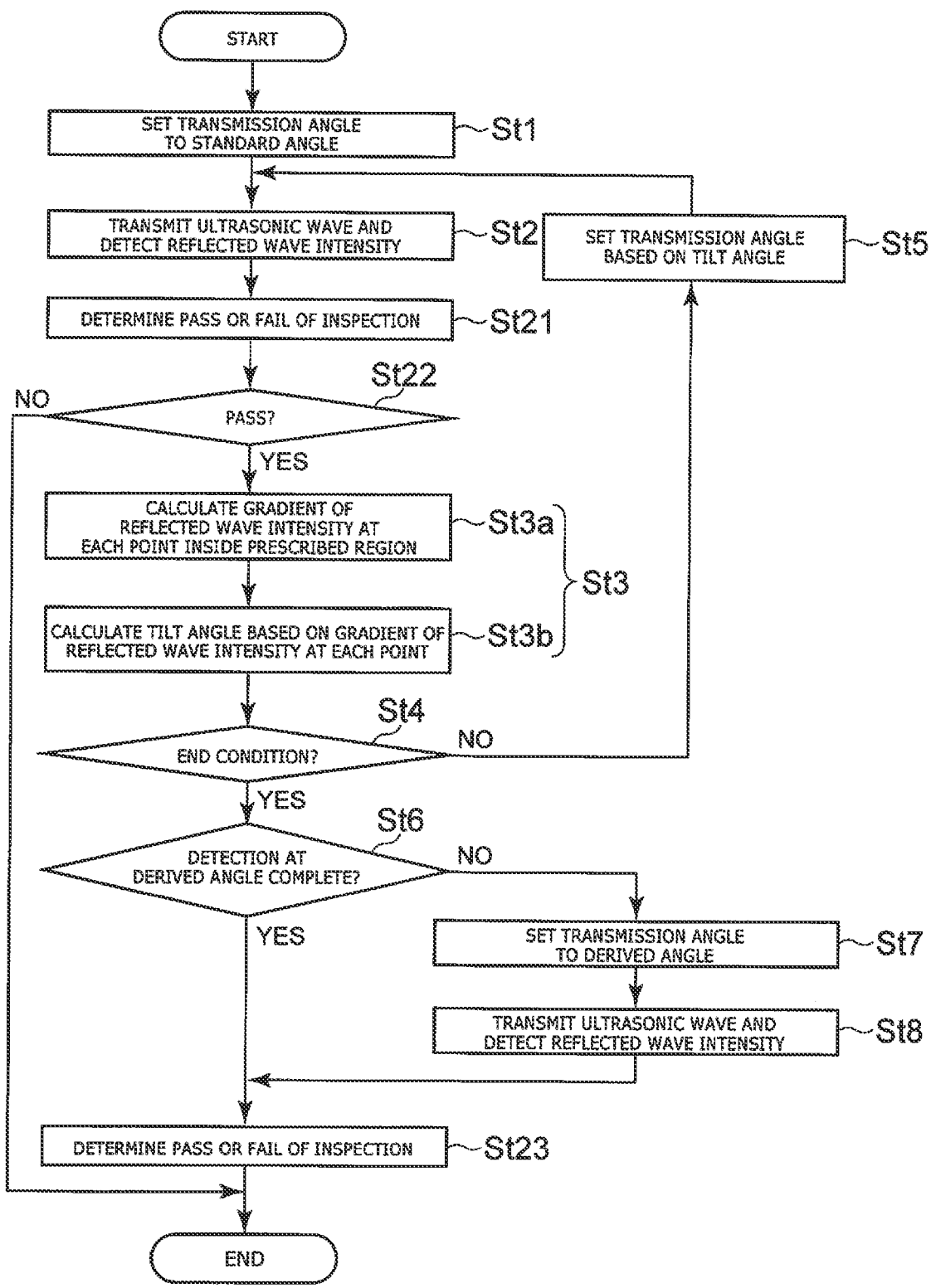
FIG. 15 is a flowchart illustrating a control method according to a third embodiment.

FIG. 15 is a flowchart illustrating a control method according to a third embodiment.

As illustrated in FIG. 15, the control method according to the third embodiment further includes steps St21, St22, and St23.

In step St21, it is determined whether or not the detection result obtained in step St2 satisfies the inspection condition. If the determination is "pass" in step St21, the determination of the inspection is "pass" in step St22; and the processing ends. Step St3 is performed if the determination is "fail" in step St21. Step St23 is performed after step St6 or St8. In step St23, pass or fail is determined based on whether or not the detection result obtained in step St8 satisfies the inspection condition.

For example, the inspection condition is set to be when the distance between the peaks of the reflected wave intensities adjacent to each other in the z-direction is a prescribed threshold or more. As illustrated in FIG. 3, the distance between the third surface S3 and the fourth surface S4 of the weld portion 93 is longer than the distance between the first surface S1 and the second surface S2 of the first member 91. The peak of the reflected wave intensity in the z-direction corresponds to the position of the surface. Accordingly, the distance between the peaks of the reflected wave intensities detected when the welding is appropriate is longer than the distance between the peaks corresponding to the first surface S1 and the second surface S2 of the first member 91. For example, the threshold is set based on the distance between the first surface S1 and the second surface S2 of the first member 91 or the distance between the third surface S3 and the fourth surface S4 of the weld portion 93.

For example, the distance between the peaks of the reflected wave intensities detected at each point (each sensor 12) in the x-direction and the y-direction is compared to the prescribed threshold. Then, the number of points where the distance between the peaks is the threshold or more is counted. Continuing, it is determined that the joint is appropriate if the count meets or exceeds another preset threshold.

According to the method illustrated in FIG. 15, the inspection ends at the point in time when the inspection condition is passed. Therefore, the inspection can be ended earlier.

Figure 16:
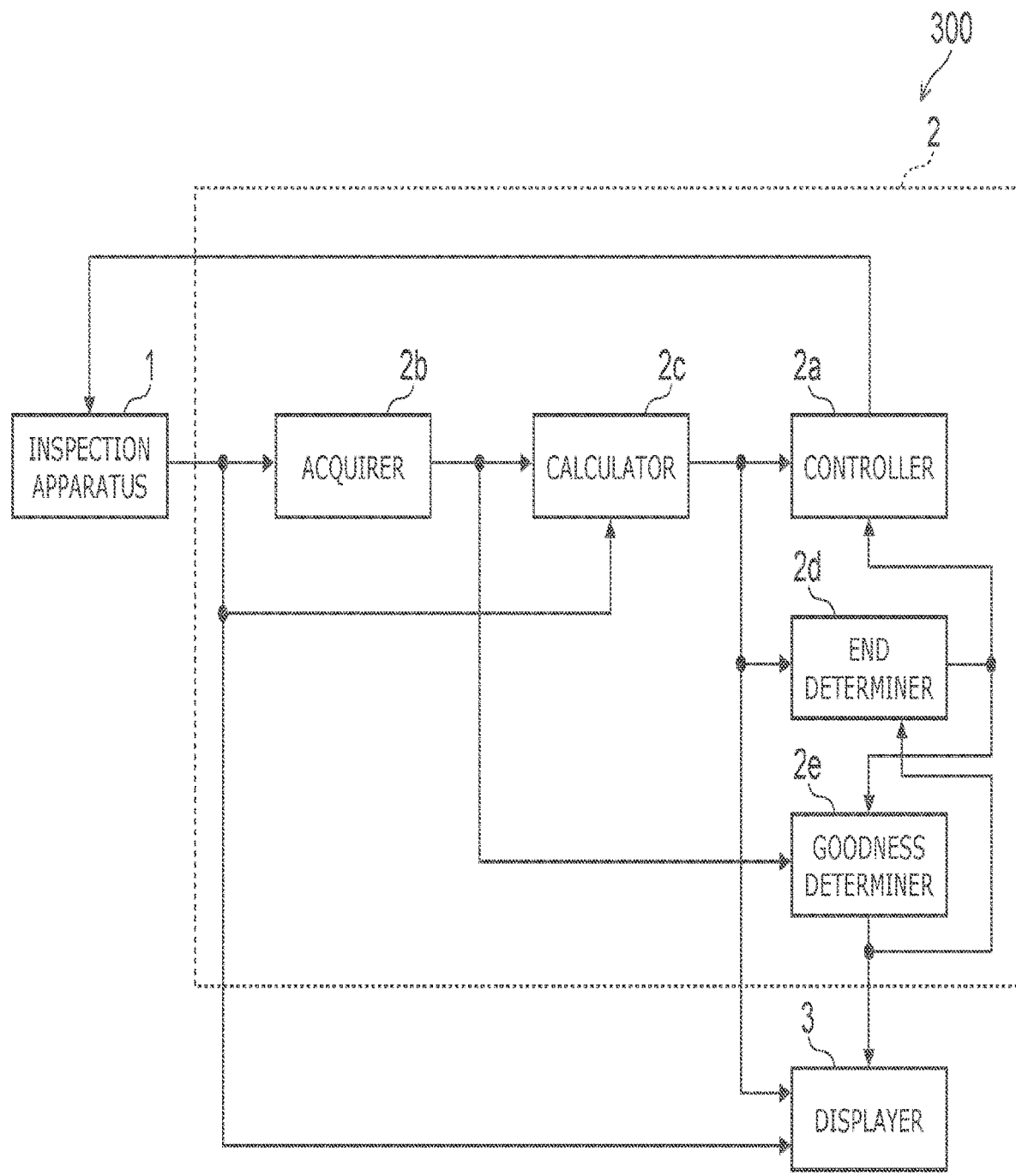
FIG. 16 is a schematic view illustrating the configuration of the inspection system according to the third embodiment.

FIG. 16 is a schematic view illustrating the configuration of the inspection system according to the third embodiment.

In the inspection system 300 according to the third embodiment, the processor 2 further includes a goodness determiner 2e. The goodness determiner 2e performs steps St21, St22, and St23.

In the example illustrated in FIG. 16, the inspection system 300 further includes the displayer 3. As described above, the displayer 3 displays the transition of the transmission angle or the tilt angle. Further, the goodness determiner 2e may transmit the determination result to the displayer 3. The displayer 3 receives and displays the determination result.

A case is described in the example hereinabove where the reflected wave intensity is multiply detected by the multiple sensors 12 arranged in the second direction and the third direction. Three-dimensional volume data is acquired by this method. The embodiments are not limited to the example; and two-dimensional data may be acquired using the multiple sensors 12. For example, the reflected wave intensity may be multiply detected by the multiple sensors 12 arranged in the second direction or the third direction. In such a case, the component of the adjusted transmission angle is one of $\theta_x$ or $\theta_y$. Even in such a case, by using the method according to the embodiments described above, a more appropriate $\theta_x$ or $\theta_y$ can be found in a shorter length of time; and the time necessary for the inspection can be shortened.

According to the embodiments described above, a control method and an inspection system can be provided in which the angle of the ultrasonic wave transmitted toward the object in the inspection can be set to a more appropriate value. The angle of the ultrasonic wave transmitted toward the object in the inspection can be set to a more appropriate value by using a program for causing a system to implement the embodiments described above, or by using a storage medium in which the program is stored.

The embodiments may include the following aspects.

Aspect 1

A control method, comprising:

setting a transmission angle of an ultrasonic wave to a standard angle;

transmitting an ultrasonic wave at the transmission angle and detecting, at multiple points, an intensity of a reflected wave from an object, the multiple points being arranged along a second direction and a third direction, the second direction crossing a first direction, the ultrasonic wave being transmitted in the first direction, the third direction crossing a plane including the first direction and the second direction; and displaying a gradient of the intensity for each of the multiple points.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components such as the inspection apparatus and the processor, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all control methods, all inspection systems, and all storage mediums practicable by an appropriate design modification by one skilled in the art based on the control methods, the inspection systems, and the storage mediums described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A processor configured to communicate with a plurality of sensors, one of the plurality of sensors emitting an ultrasonic wave and the plurality of sensors receiving a reflected wave, the processor performing: a first step of receiving a first detection result of the reflected wave from an object, the first detection result including intensity of the reflected wave at a plurality of positions in a transmitting direction of the ultrasonic wave; a second step of calculating a tilt angle based on a gradient of the intensity for each of the plurality of positions, the tilt angle indicating a tilt of the object, and
   a third step of adjusting a transmission direction based on the tilt angle.

2. The processor according to claim 1, wherein the first step and the second step are performed again after the third step.

3. The processor according to claim 1, wherein
   a first loop of repeating the first step, the second step, and the third step is performed after the third step,
   the first loop further includes a fourth step of determining whether or not to end the first loop, and
   the first loop is performed until the determining step determines to end the first loop has ended.

4. The processor according to claim 3, wherein the fourth step determines that the first loop has ended when a number of repetitions of the detecting step or the calculating step reaches a prescribed number of times or more.

5. The processor according to claim 3, wherein
   a plurality of the tilt angles is calculated by the repeated first loops respectively, the plurality of tilt angles including a first tilt angle and a second tilt angle, the first tilt angle being calculated in one of the repeated first loops, the second tilt angle being calculated in another one of the repeated first loops, the second tilt angle being calculated after the first tilt angle,
   a difference between the first tilt angle and the second tilt angle is calculated, and
   the fourth step determines that the first loop has ended when the difference is less than a prescribed value.

6. The processor according to claim 3, further comprising a fifth step of displaying a transition of the transmission direction or the tilt angle caused by the first loop.

7. The processor according to claim 1, wherein
   the third step causes a change of the transmission direction to be larger than a difference between a standard angle and the tilt angle, and
   the first detection result is obtained when the transmission direction is set to the standard angle.

8. The processor according to claim 1, wherein
   after the third step, the processor receives a second detection result of the reflected wave from the object when the ultrasonic wave is transmitted along the adjusted transmission direction,
   the processor inspects the object by using the second detection result.

9. The processor according to claim 8, wherein in inspecting the object, the processor
- determines whether each of a plurality of points is appropriately jointed or not, the plurality of points being arranged along a second direction and a third direction, the second direction crossing a first direction aligned with the transmission direction, the third direction crossing a plane including the first direction and the second direction, and
- inspects the object based on a number of the points determined appropriately jointed.

10. The processor according to claim 1, wherein
- the first step receives a plurality of the first detection result detected at a plurality of points,
- the plurality of points is arranged along a second direction and a third direction,
- the second direction crosses a first direction aligned with the transmission direction,
- the third direction crosses a plane including the first direction and the second direction, and
- the second step calculates the tilt angle based on the gradient of the intensity in three-dimensional space defined by the first direction, the second direction, and the third direction.

11. An inspection system, comprising:
- the processor according to claim 1; and
- the plurality of sensors.

12. The inspection system according to claim 11, further comprising a robot arm,
- the plurality of sensors being provided in a probe,
- the probe being attached a tip of the robot arm.

13. A method, causing a processor to: communicate with a plurality of sensors, one of the plurality of sensors emitting an ultrasonic wave and the plurality of sensors receiving a reflected wave; perform a first step of receiving a first detection result of the reflected wave from an object, the first detection result including intensity of the reflected wave at a plurality of positions in a transmitting direction of the ultrasonic wave; perform a second step of calculating a tilt angle based on a gradient of the intensity for each of the plurality of positions, the tilt angle indicating a tilt of the object, and
- perform a third step of adjusting the transmission direction based on the tilt angle.

14. The method according to claim 13, wherein the first step and the second step are performed again after the third step.

15. The method according to claim 13, further causing the processor to:
- receive, after the third step, a second detection result of the reflected wave from the object when the ultrasonic wave is transmitted along the adjusted transmission direction; and
- inspects the object by using the second detection result.

16. A non-transitory computer readable storage medium storing a program causing the processor to perform the method according to claim 13.

* * * * *

UNITED STATES PATENT AND TRADEMARK OFFICE
CERTIFICATE OF CORRECTION

PATENT NO. : 11,709,151 B2
APPLICATION NO. : 17/565154
DATED : July 25, 2023
INVENTOR(S) : Toshiyuki Ono et al.

Page 1 of 1

It is certified that error appears in the above-identified patent and that said Letters Patent is hereby corrected as shown below:

In the Claims

• Claim 3, Column 12, Lines 34-35, "the first loop is performed until the determining step determines to end the first loop has ended" should read --the first loop is performed until the determining step determines to end the first loop--.

• Claim 12, Column 14, Line 2, "the probe being attached a tip of the robot arm" should read --the probe being attached to a tip of the robot arm--.

Signed and Sealed this
Twenty-fourth Day of October, 2023

Katherine Kelly Vidal
*Director of the United States Patent and Trademark Office*